United States Patent
Castro

(10) Patent No.: US 7,325,171 B2
(45) Date of Patent: Jan. 29, 2008

(54) MEASUREMENT AND DATA ACQUISITION SYSTEM INCLUDING A REAL-TIME MONITORING CIRCUIT FOR IMPLEMENTING CONTROL LOOP APPLICATIONS

(75) Inventor: Rafael Castro, Austin, TX (US)

(73) Assignee: National Instruments Corporation, Austin, TX (US)

( * ) Notice: Subject to any disclaimer, the term of this patent is extended or adjusted under 35 U.S.C. 154(b) by 503 days.

(21) Appl. No.: 11/063,141

(22) Filed: Feb. 22, 2005

(65) Prior Publication Data

US 2006/0197607 A1   Sep. 7, 2006

(51) Int. Cl.
| | |
|---|---|
| G06F 11/00 | (2006.01) |
| G06F 3/00 | (2006.01) |
| G06F 5/00 | (2006.01) |
| G06F 19/00 | (2006.01) |
| G01R 25/00 | (2006.01) |
| G01R 29/02 | (2006.01) |
| G01M 19/00 | (2006.01) |
| G05B 11/01 | (2006.01) |

(52) U.S. Cl. ............................ 714/56; 714/51; 710/58; 702/79; 702/125; 700/14; 700/26

(58) Field of Classification Search .................. 700/14, 700/25, 26, 27; 702/57, 79, 124, 125, 126, 702/176; 710/58, 69, 70; 714/48, 51, 55, 714/56

See application file for complete search history.

(56) References Cited

U.S. PATENT DOCUMENTS

| | | | |
|---|---|---|---|
| 4,957,083 A | * | 9/1990 | Nakaniwa et al. .......... 123/436 |
| 5,533,037 A | | 7/1996 | Shah et al. |
| 6,037,734 A | * | 3/2000 | Toyomura ................... 318/602 |
| 6,232,737 B1 | * | 5/2001 | Kachi et al. ................ 318/610 |
| 6,567,709 B1 | | 5/2003 | Malm et al. |
| 6,598,007 B2 | | 7/2003 | Moizio et al. |
| 6,735,630 B1 | | 5/2004 | Gelvin et al. |
| 6,820,028 B2 | | 11/2004 | Ye et al. |
| 6,832,251 B1 | | 12/2004 | Gelvin et al. |
| 7,135,831 B2 | * | 11/2006 | Akiyama .................... 318/601 |
| 7,215,166 B2 | * | 5/2007 | Tani .......................... 327/158 |
| 2001/0043153 A1 | | 11/2001 | Gordon et al. |
| 2002/0059803 A1 | | 5/2002 | Jayanth |
| 2003/0051490 A1 | | 3/2003 | Jayanth |
| 2004/0196926 A1 | * | 10/2004 | Chien et al. ................ 375/316 |
| 2004/0206096 A1 | | 10/2004 | Jayanth |
| 2005/0000235 A1 | | 1/2005 | Jayanth |

* cited by examiner

Primary Examiner—Crystal J. Barnes
(74) Attorney, Agent, or Firm—Meyertons Hood Kivlin Kowert & Goetzel, P.C.; Jeffrey C. Hood; Mario J. Lewin

(57) ABSTRACT

A measurement and data acquisition system including a real-time monitoring circuit for implementing control loop applications. The system control loop may include the real-time monitoring circuit, a data acquisition device, a processing unit, and a plurality of subsystems. The subsystems may be comprised in the data acquisition device or may be external to the data acquisition device. The real-time monitoring circuit may receive a plurality of timing signals from the plurality of subsystems and may select a control loop timing signal out of the plurality of timing signals. The real-time monitoring circuit may determine whether the operations of the control loop are performed within a particular period of time by monitoring the control loop timing signal and communicating with the processing unit. In response to an error notification, the processing unit may take appropriate action, such as shutting down the system and/or reporting an error or warning.

33 Claims, 4 Drawing Sheets

MEASUREMENT AND DATA ACQUISITION SYSTEM INCLUDING A REAL-TIME MONITORING CIRCUIT FOR IMPLEMENTING CONTROL LOOP APPLICATIONS

BACKGROUND OF THE INVENTION

1. Field of the Invention

This invention relates generally to measurement and data acquisition systems and, more particularly, to a measurement and data acquisition system including a real-time monitoring circuit for implementing a control loop.

2. Description of the Related Art

Scientists and engineers often use measurement systems to perform a variety of functions, including measurement of a physical phenomena or unit under test (UUT), test and analysis of physical phenomena, process monitoring and control, control of mechanical or electrical machinery, data logging, laboratory research, and analytical chemistry, to name a few examples.

A typical measurement system comprises a computer system with a measurement device or measurement hardware. The measurement device may be a computer-based instrument, a data acquisition device or board, a programmable logic device (PLD), an actuator, or other type of device for acquiring or generating data. The measurement device may be a card or board plugged into one of the I/O slots of the computer system, or a card or board plugged into a chassis, or an external device. For example, in a common measurement system configuration, the measurement hardware is coupled to the computer system through a PCI bus, PXI (PCI extensions for Instrumentation) bus, a GPIB (General-Purpose Interface Bus), a VXI (VME extensions for Instrumentation) bus, a serial port, parallel port, or Ethernet port of the computer system. Optionally, the measurement system includes signal conditioning devices which receive field signals and condition the signals to be acquired.

A measurement system may typically include transducers, sensors, or other detecting means for providing "field" electrical signals representing a process, physical phenomena, equipment being monitored or measured, etc. The field signals are provided to the measurement hardware. In addition, a measurement system may also typically include actuators for generating output signals for stimulating a unit under test.

Measurement systems, which may also be generally referred to as data acquisition systems, may include the process of converting a physical phenomenon (such as temperature or pressure) into an electrical signal and measuring the signal in order to extract information. Computer-based measurement and data acquisition (DAQ) systems and plug-in boards are used in a wide range of applications in the laboratory, in the field, and on the manufacturing plant floor, among others.

In a measurement or data acquisition process, analog signals may be received by a digitizer, which may reside in a DAQ device or instrumentation device. The analog signals may be received from a sensor, converted to digital data (possibly after being conditioned) by an analog-to-digital converter (ADC), and transmitted to a computer system for storage and/or analysis. When a measurement system generates an output analog signal, the computer system may generate digital signals that are provided to one or more digital-to-analog converters (DACs) in the DAQ device. The DACs may convert the digital signal to an output analog signal that is used, e.g., to stimulate a UUT.

Computer-based measurement and data acquisition systems may be used to implement control loop operations. A typical data acquisition system has one or more analog inputs, analog outputs, digital inputs, digital outputs and other subsystems. Each one of these subsystems may be designed to work on its own and to provide feedback to software running the system about performance and possible error conditions. A control loop application typically involves several of these subsystems working together.

Control loop operations solved with a computer system may impose a real-time requirement on the computer hardware and software, and because of that have a maximum reaction latency requirement. In other words, all the operations on the loop may need to take place within a specific period of time. Therefore, the software running on the computer typically needs to have feedback from the hardware as to whether or not this latency requirement is being meet. In control loop applications, not only may software need to know whether each resource is operating correctly and within the limits of the specific timing, but the software may additionally need to know whether all the resources meet the requirements of the control loop.

In some prior art systems, control loop applications use the feedback of each individual element of the system to try to build an overall status of the control loop and to determine whether real-time operation is being maintained. One of the drawbacks to this model is that it can become very complex. The more subsystems that are involved in the application, the more status information that may need to be kept track of by the system, which may greatly complicate the software. Second, since each subsystem needs to be monitored, this adds to the processing time of the control loop, resulting in relatively slow control loop rates. Also, in many instances all subsystems involved are required to be capable of monitoring real-time operation. Besides the fact that it may not be possible, this requirement may add to the complexity and cost of the system.

SUMMARY OF THE INVENTION

Various embodiments of a measurement and data acquisition system including a real-time monitoring circuit for implementing control loop applications are disclosed. In one embodiment, the real-time monitoring circuit may be comprised in an IC (e.g., a timing and data control ASIC) of a data acquisition device. In another embodiment, the real-time monitoring circuit may be comprised in a field programmable gate array (FPGA) of the data acquisition device. The data acquisition system may comprise the data acquisition device coupled to a computer system (e.g., a desktop PC or a handheld device) and a unit under test (UUT). It is noted in other embodiments the real-time monitoring circuit may be included in various types of analog-to-digital and digital-to-analog systems or devices, e.g., any system or device that may be used to implement control loop applications.

In one embodiment, the measurement and data acquisition system for implementing control loop applications may include a plurality of subsystems, a processing unit, a data acquisition device, and the real-time monitoring circuit. The subsystems may be comprised in the data acquisition device or may be external to the data acquisition device. The control loop operations may impose real-time requirements on the hardware and software in the system. In control loop applications, there is typically a period constraint generated by one of the subsystems involved in the control loop, which may be defined by a control loop timing signal. The control loop timing signal, which may be referred to as the "Control Loop Clock" (CLC), may be a periodic pulse with a period equal to the control loop period. It is noted however that in other embodiments the timing signal may not be periodic and may rather be random, e.g., a random pulse train. In one embodiment, a significant event may be defined as the rising or falling edge of the CLC. The significant event of the CLC may mark the boundaries for a control loop operation. For example, if the significant event is defined as the rising edge of the CLC, then the time limit for performing a control loop operation is the time period between rising edges of the CLC.

In one embodiment, at least a portion of the plurality of subsystems may provide a plurality of timing signals for the system. The real-time monitoring circuit may be connected to the portion of the plurality of subsystems that provide timing signals to the system. The real-time monitoring circuit may receive the plurality of timing signals and select the CLC out of the plurality of timing signals. The processing unit may program the real-time monitoring circuit to select the appropriate timing signal (i.e., the CLC), which is received from one of the plurality of subsystems involved in the control loop.

In one embodiment, the real-time monitoring circuit may include a first and a second edge detector. The first edge detectors may receive the CLC and detect a significant event indicating a start of a time period allotted for completion of the control loop operation. An event active (EA) bit may be asserted in response to the first edge detector detecting a significant event in the CLC. When the EA bit is asserted, the real-time monitoring circuit may notify the processing unit that a significant event occurred. In response to the notification, the processing unit may communicate with all the subsystems in the control loop to initiate the control loop application. After the control loop operation has been completed, the processing unit may send an acknowledge signal to the real-time monitoring circuit to indicate the completion of the operation. The first edge detector may deassert the EA bit in response to the acknowledge signal.

In one embodiment, during the control loop operation, the second edge detector may monitor the CLC and the EA bit to detect any state changes. The second edge detector may determine whether the EA bit was deasserted before or after the next significant event of the CLC is detected. If the acknowledge signal is received before the next CLC significant event, then the control loop operation is being performed properly and in real-time and the system continues implementing control loop applications. However, if the acknowledge signal is received after the next CLC significant event, then the second edge detector may assert a latency error bit (LEB) to indicate an error, i.e., that the CLC period is faster than the time it took to perform the control loop operation. In response to the error notification, the processing unit may take appropriate action, such as shutting down the system and/or reporting an error or warning. In some instances, the processing unit may ignore the error, reset the LEB, and try again.

Figure 1:
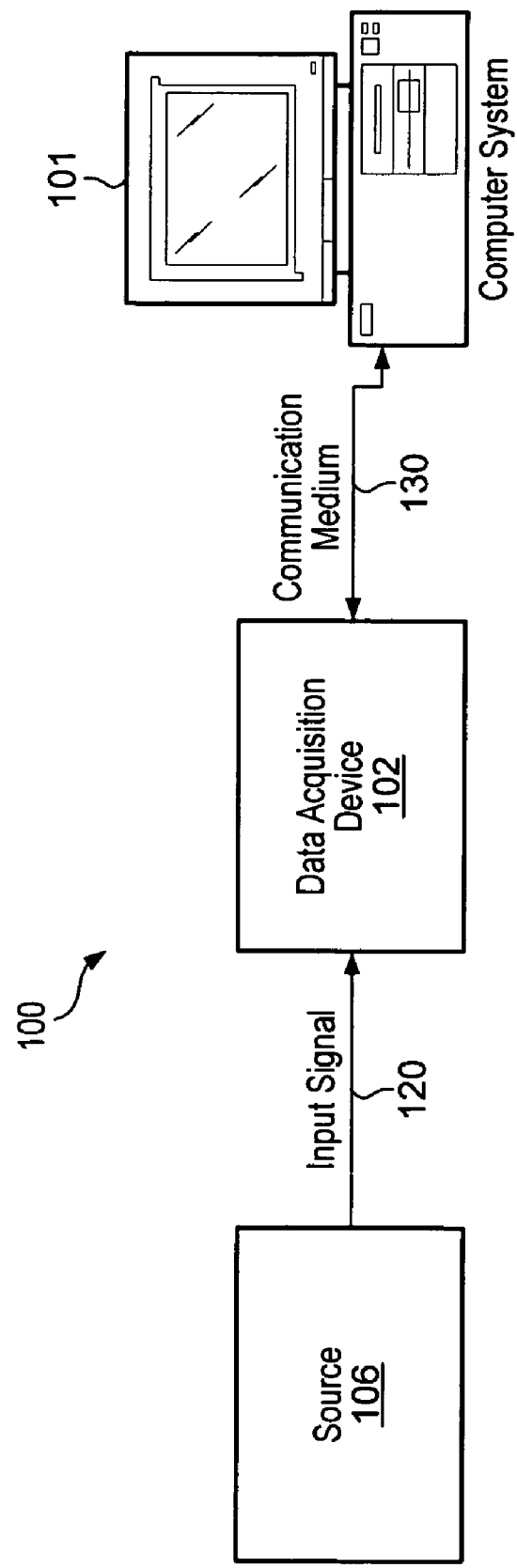
FIG. 1 is a diagram of one embodiment of a computer-based measurement system or data acquisition system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Data Acquisition System

FIG. 1 is a diagram of one embodiment of a computer-based measurement system or data acquisition system 100. The data acquisition system 100 may comprise a computer system 101, which may be coupled to a measurement device, referred to as data acquisition (DAQ) device 102, through a communication medium 130. The DAQ device 102 may be an internal card or board coupled to a bus, e.g., a Peripheral Component Interconnect (PCI), PCI Express, Industry Standard Architecture (ISA), or Extended Industry Standard Architecture (EISA) bus, but is shown external to the computer 101 for illustrative purposes. The measurement device or DAQ device 102 may also be an external device coupled to the computer system 101. In this embodiment, the communication medium 130 may be a serial bus, such as USB, IEEE 1394, MXI bus, Ethernet, or a proprietary bus, or a parallel bus such as GPIB or others. It is noted that the communication medium 130 may be a wired or wireless communication medium.

The DAQ device 102 may be coupled to an external source 106, such as an instrument, sensor, transducer, or actuator from which the DAQ device 102 may receive an input signal 120, e.g., an analog input such as sensor data. In one example, the external source 106 may be a temperature sensor, which is comprised in a unit under test (UUT). In this example, the DAQ device 102 may receive temperature reading from the temperature sensor and convert the analog data to digital form to be sent to the computer system 101 for analysis. Additionally, the DAQ device 102 may receive a digital input, e.g., a binary pattern, from the external source 106 (e.g., a UUT). Furthermore, the DAQ device 102 may also produce analog or digital signals, e.g., for stimulating the UUT. These data acquisition and signal generation functions may be performed to implement control loop applications in the data acquisition system 100. In one embodiment, the DAQ device 102 may include a real-time monitoring circuit to monitor the timing of control loop applications. The real-time monitoring circuit may determine whether the operations of the control loop are performed within a particular period of time by communicating with a processing unit, e.g., computer system 101, as will be further described below with reference to FIGS. 3 and 4.

The computer system 101 may be operable to control the DAQ device 102. For example, the computer system 101 may be operable to direct the DAQ device 102 to perform an acquisition, and may obtain data from the DAQ device 102 for storage and analysis therein. Additionally, the computer system 101 may be operable to send data to the device 102 for various purposes, such as for use in generating analog signals used for stimulating a UUT.

The computer system 101 may include a processor, which may be any of various types, including an x86 processor, e.g., a Pentium™ class, a PowerPC™ processor, a CPU from the SPARC™ family of RISC processors, as well as others. Also, the computer system 101 may also include one or more memory subsystems (e.g., Dynamic Random Access Memory (DRAM) devices). The memory subsystems may collectively form the main memory of computer system 101 from which programs primarily execute. The main memory may be operable to store a user application and a driver software program. The user application may be executable by the processor to conduct the data acquisition/generation process. The driver software program may be executable by the processor to receive data acquisition/generation tasks from the user application and program the DAQ device 102 accordingly.

Data Acquisition Device

Figure 2:
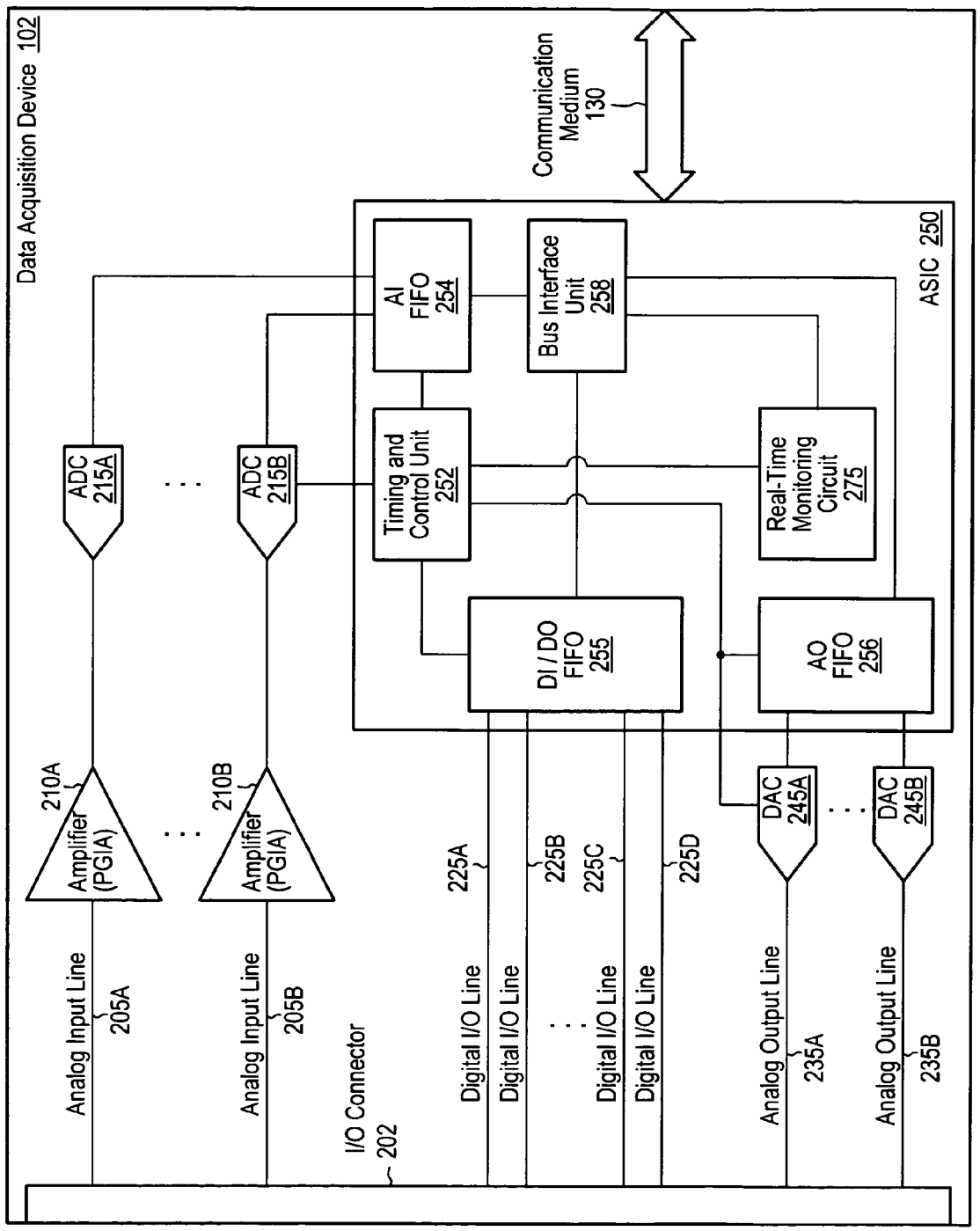
FIG. 2 is a block diagram of one embodiment of a data acquisition (DAQ) device including a real-time monitoring circuit for implementing control loop applications.

FIG. 2 is a block diagram of one embodiment of a data acquisition (DAQ) device 102. Components that correspond to those shown in FIG. 1 are numbered identically for simplicity and clarity. As described above, the DAQ device 102 may be an internal device coupled to, e.g., a PCI bus, or may also be an external device coupled to the computer system 101 via a serial bus, e.g., NMXI bus, or a parallel bus, e.g., a GPIB. The DAQ device 102 may be a board or a module comprising one or more integrated circuits (ICs) or the DAQ device 102 may be an IC, for example, a mixed-signal IC.

The DAQ device 102 may comprise an input/output (I/O) connector 202, analog input lines 205A and 205B, amplifiers 210A and 210B, analog-to-digital converters (ADCs) 215A and 215B, digital I/O lines 225A, 225B, 225C, and 225D, analog output lines 235A and 235B, a timing and data control IC (e.g., application-specific integrated circuit (ASIC) 250), digital-to-analog converters (DACs) 245A and 245B, and communication medium 130. It should be noted that the components described with reference to FIG. 2 are meant to be exemplary only, and are not intended to limit the invention to any specific set of components or configurations. For example, in various embodiments, one or more of the components described may be omitted, combined, modified, or additional components included, as desired. It is also noted that the DAQ device 102 may be comprised in any type of system, such as desktops, portable appliances, servers, communication products, industrial automation systems, motion control devices, workstations, and instrumentation chassis, among others.

The DAQ device 102 may receive and send digital and/or analog data via the input and output lines of the I/O connector 202. For example, the I/O connector 202 may be coupled to a signal source (e.g., source 106 of FIG.1) comprised in a UUT to receive analog signals. The I/O connector 202 may comprise analog input lines 205A and 205B, which may convey the received analog signals to amplifier 210A. It is noted however that in other embodiments the DAQ device 102 may comprise any number of analog input lines, e.g., four analog input lines.

In one embodiment, amplifiers 210A and 210B may be programmable gain instrumentation amplifiers (PGIAs). PGIAs are typically differential amplifiers having a high input impedance and a gain that is adjustable through the variation of a single resistor. The amplifier 210A may apply a specified amount of gain to the input signal to ensure proper analog-to-digital conversion. Also, PGIAs may convert differential input signals into single-ended outputs, which may be needed for the ADC (e.g., ADC 215A) to correctly digitize the data. It is noted however that in other embodiments amplifier 210A and/or amplifier 210B may be other types of amplifiers typically used in data acquisition devices. It is also noted that DAQ device 102 may comprise any number of amplifiers, e.g., a single amplifier or four amplifiers.

The output of amplifier 210A may be connected to ADC 215A, which may digitize the analog signals. ADCs are devices that convert a continuously varying (analog) signal into a discrete (digital) signal. The resolution of the ADC typically indicates the number of discrete values it can produce. For example, if the ADC has an eight-bit resolution, the ADC may be able to encode an analog input to one of 256 discrete values (since $2^8=256$). Each discrete value is derived by sampling the analog signal at particular times (e.g., a periodic rate). More specifically, the signal values are measured and stored at particular times. An ADC typically includes a sample and hold circuit, which holds the input value constant during the time the ADC performs the analog-to-digital conversion, since the ADC cannot make an instantaneous conversion. It is noted however that in other embodiments the DAQ device 102 may comprise any number of ADCs, for example, the DAQ device 102 may include a single ADC or four ADCs.

After the signals are digitized, the ADC 215A may send the digital signals to the ASIC 250. In one embodiment, the ASIC 250 may be a digital IC, which may be configured to perform the timing and data control functions for the DAQ device 102. The ASIC 250 may include a timing and control unit 252, a real-time monitoring circuit 275, an analog input (AI) first-in first-out (FIFO) buffer 254, a digital input (DI)/digital output (DO) FIFO buffer 255, an analog output (AO) FIFO buffer 256, and a bus interface unit 258. It is noted that in other embodiments one or more of the components of ASIC 250 may be omitted, combined, modified, or additional components included, as desired. For example, in other embodiments, other types of AI and AO buffers may be used. Also, in some embodiments, the real-time monitoring circuit 275 may be external to the ASIC 250.

The ASIC 250 may receive the digitized signals from ADC 215A at the AI FIFO buffer 254. FIFO buffers are storage devices that may output the stored data in the order the data was received. After being stored in the AI FIFO buffer 254, the digitized data may be sent to the bus interface unit 258. In one embodiment, the bus interface unit 258 may be coupled to the communication medium 130 for sending data to and receiving data from a computer system (e.g., computer system 101 of FIG. 1). The bus interface unit 258 may be operable to implement the protocol associated with the type of bus coupled to the DAQ device 102. As described above, exemplary buses coupled to the bus interface unit 258 include a PCI, PCI Express, USB, IEEE 1394, PXI bus, or Ethernet, among others. In one embodiment, the bus interface unit 258 may send the digitized data to the computer system 101 for storage and analysis of the data.

As described above, the computer system (e.g., computer system 101 of FIG. 1) may provide digital signals to the DAQ device 102 to stimulate a UUT. In one embodiment, the digital signals may need to be converted to analog form to stimulate the UUT. Therefore, in this embodiment, after the ASIC 250 of DAQ device 102 receives the digital signals and stores them in AO FIFO buffer 256, the digital data may be transmitted to DAC 245A to be converted to analog form. DACs are devices that convert discrete (digital) signals into continuously varying (analog) signals. For example, if an analog signal was initially converted to digital form, a DAC may be able to reproduce the analog signal if provided with the digital data. It is noted that the DAQ device 102 may comprise any number of DACs, for example, other embodiments may include a single DAC or four DACs. After the digital data is converted to analog form, the analog signals may be sent to the I/O connector 202 via the analog output line 235A.

In one embodiment, digital signals may be received at the I/O connector 202. The received digital signals may be sent to the ASIC 250 via one or more of the digital I/O lines 225A-D. In one embodiment, the digital I/O lines 225A-D are general-purpose, bidirectional digital I/O lines, which may be configured to send and receive digital data. When the ASIC 250 receives the digital signals, the data may be stored in the DI/DO FIFO buffer 255. After being stored in the DI/DO FIFO buffer 255, the digital data may be sent to the bus interface unit 258, which may convey the digital data to the computer system 101, as described above. It is noted that digital data received via the bus interface unit 258 may also be stored in DI/DO FIFO buffer 255 before being sent to the I/O connector 202 via one or more of the digital I/O lines 225A-D.

The ASIC 250 may include the timing and control unit 252 to provide timing and control and data management functions for the DAQ device 102 during, e.g., a data acquisition process. The timing and control unit may comprise one or more counter/timers, which may be used in various applications, including counting the occurrences of a digital event, digital pulse timing, and generating square waves and pulses. The timing and control unit 252 may be coupled to the one or more FIFO buffers (e.g., AO FIFO buffer 256) of the DAQ device 102 to provide timing and control signals for storing data received from, e.g., the bus interface 258, and for sending data from, e.g., the AO FIFO buffer 256 to the DAC 245A. Furthermore, the timing and control unit 252 may be coupled to the ADCs (e.g., ADC 215A) and DACs (e.g., ADC 245A) of the DAQ device 102 to provide timing and control signals for performing the data conversion functions that may be necessary in data acquisition processes.

In one embodiment, the data acquisition processes may be performed to implement control loop applications in the system (e.g., data acquisition system 100 of FIG. 1). The ASIC 250 may include a real-time monitoring circuit 275 to monitor the timing of control loop applications. In another embodiment, the real-time monitoring circuit may be located external to the ASIC 250 but within the DAQ device 102, for example, in a field programmable gate array (F-PGA). Besides the real-time monitoring circuit, the control loop may include a plurality of subsystems and a processing unit. The real-time monitoring circuit may determine whether the operations of the control loop are performed within a particular period of time by communicating with the processing unit, as will be further described below with reference to FIGS. 3 and 4.

In one embodiment, the real-time monitoring unit 275, the timing and control unit 252, and/or the bus interface unit 258 may be implemented in hardware. In a further embodiment, the real-time monitoring unit 275, the timing and control unit 252, and/or the bus interface unit 258 may be implemented in software. In yet another embodiment, the real-time monitoring unit 275, the timing and control unit 252, and/or the bus interface unit 258 may be implemented in both hardware and software. In one embodiment, the functionality described above with respect to the real-time monitoring unit 275, the timing and control unit 252, and/or the bus interface unit 258 may be distributed across multiple components. In various embodiments, this type of functional distribution may also apply to other components described herein.

System Including a Real-time Monitoring Circuit

Figure 3:
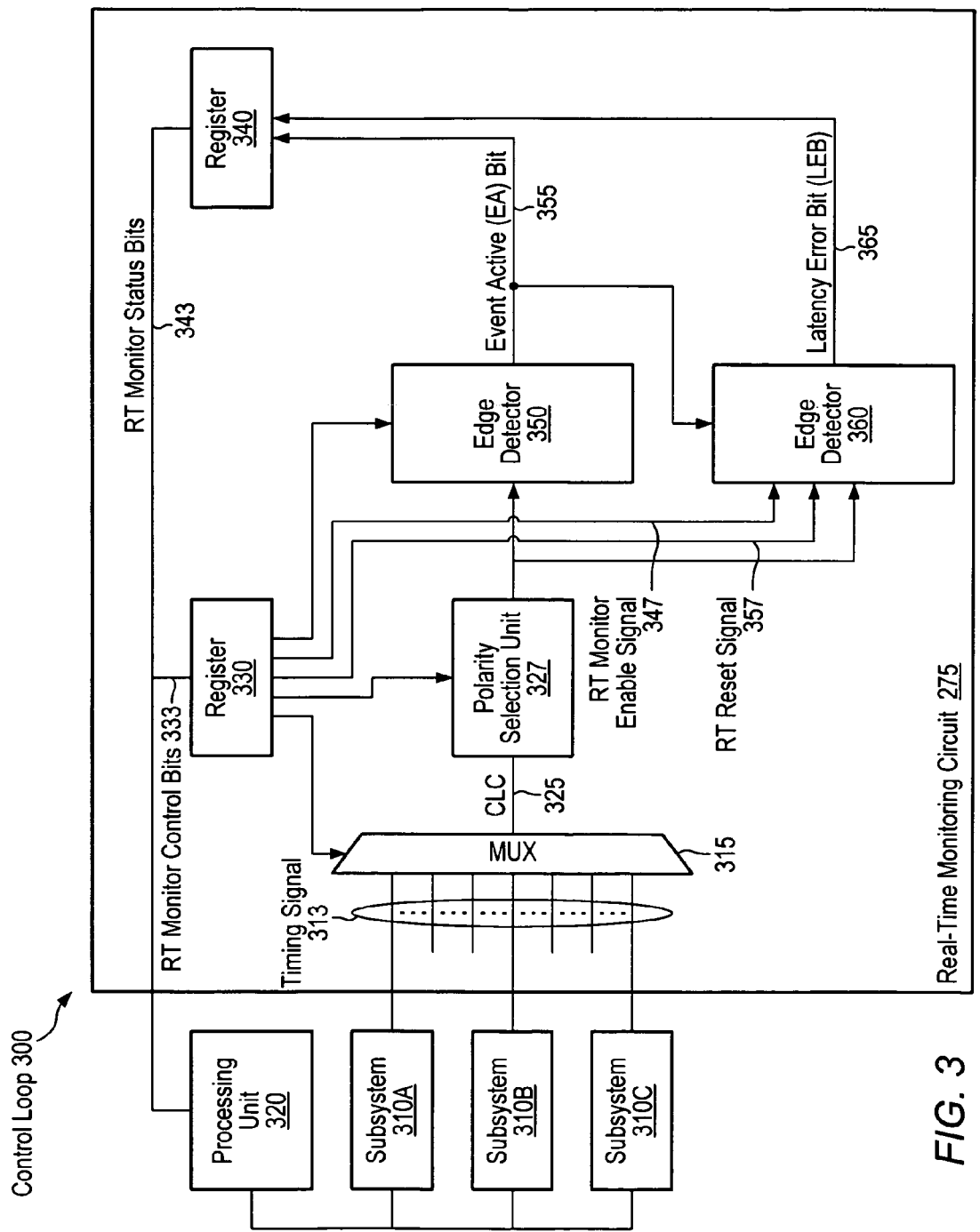
FIG. 3 is a block diagram of one embodiment of a real-time monitoring circuit for implementing control loop applications in measurement and data acquisition systems.

Turning now to FIG. 3, a block diagram of one embodiment of a measurement and data acquisition system including the real-time monitoring circuit 275 for implementing control loop applications is shown. Components that correspond to those shown in FIG. 2 are numbered identically for simplicity and clarity. In one embodiment, the real-time monitoring circuit 275 may be an IC, for example, a digital IC. In one embodiment, the real-time monitoring circuit 275 may be comprised in a timing and data management IC (e.g., ASIC 250 of FIG. 2). In another embodiment, the real-time monitoring circuit 275 may be located external to the timing and data management IC but within the data acquisition device (e.g., DAQ device 102 of FIG. 2), for example, in a field programmable gate array (FPGA)

The real-time monitoring circuit 275 may comprise a multiplexer 315, a polarity selection unit 327, a register 330, a register 340, an edge detector 350, and an edge detector 360. The real-time monitoring circuit 275 may be coupled to a processing unit 320 and a plurality of subsystems 310. In one embodiment, the real-time monitoring circuit 275, the data acquisition device (e.g., the DAQ device 102 of FIG. 1), the processing unit 320, and the subsystems 310 may be part of a control loop 300 for implementing control loop operations. The processing unit 320 may be comprised in a computer system, e.g., the CPU of the computer system 101 of FIG. 1. A portion or all of the subsystems 310 may be comprised in the data acquisition device, the computer system, or in another device, system, or network connected to the data acquisition device and/or computer system. For example, subsystem 310A may be comprised in the data acquisition device, subsystem 310B may be comprised in the computer system, and subsystem 310C may be included in a controller area network (CAN) coupled to the computer system. It is noted however that in other embodiments the control loop 300 may comprise any number of subsystems 310, e.g., ten subsystems.

It should be noted that the components described with reference to FIG. 3 are meant to be exemplary only, and are not intended to limit the invention to any specific set of components or configurations. For example, in various embodiments, one or more of the components described may be omitted, combined, modified, or additional components included, as desired.

In control loop applications, there is typically a period constraint (e.g., a timing signal) generated by one of the subsystems involved in the control loop (e.g., control loop 300) to impose real-time requirements on the operations. The control loop timing signal, which may be referred to as the "Control Loop Clock" (CLC) 325, may be a periodic pulse with a period-equal to the control loop period. It is noted however that in other embodiments the timing signal may be not be periodic and may rather be random, e.g., a random pulse train. In one embodiment, a significant event may be defined as the rising or falling edge of the CLC 325. The significant event of the CLC 325 may mark the boundaries for the control loop operation. For example, if the significant event is defined as the rising edge of the CLC 325, then the time limit for performing a control loop operation is the time period between rising edges of the CLC 325.

Typically, each time that a significant event is detected in the CLC 325 some operations may need to be performed. For example, in one embodiment, input variables may be sampled (e.g., ADC's, digital inputs), then an algorithm may make decisions based on the history of the system and the inputs recently sampled, and finally, outputs may be updated with the output of the control algorithm. In this example, these steps may need to be performed before another CLC significant event occurs for the control system to operate properly. If this particular timing condition is not met, the processing unit 320 may be notified of the error so it can take appropriate action. In some instances, the processing unit 320 may ignore the error and try again. However, in other cases, the processing unit 320 may need to shut down the whole system.

Figure 4:
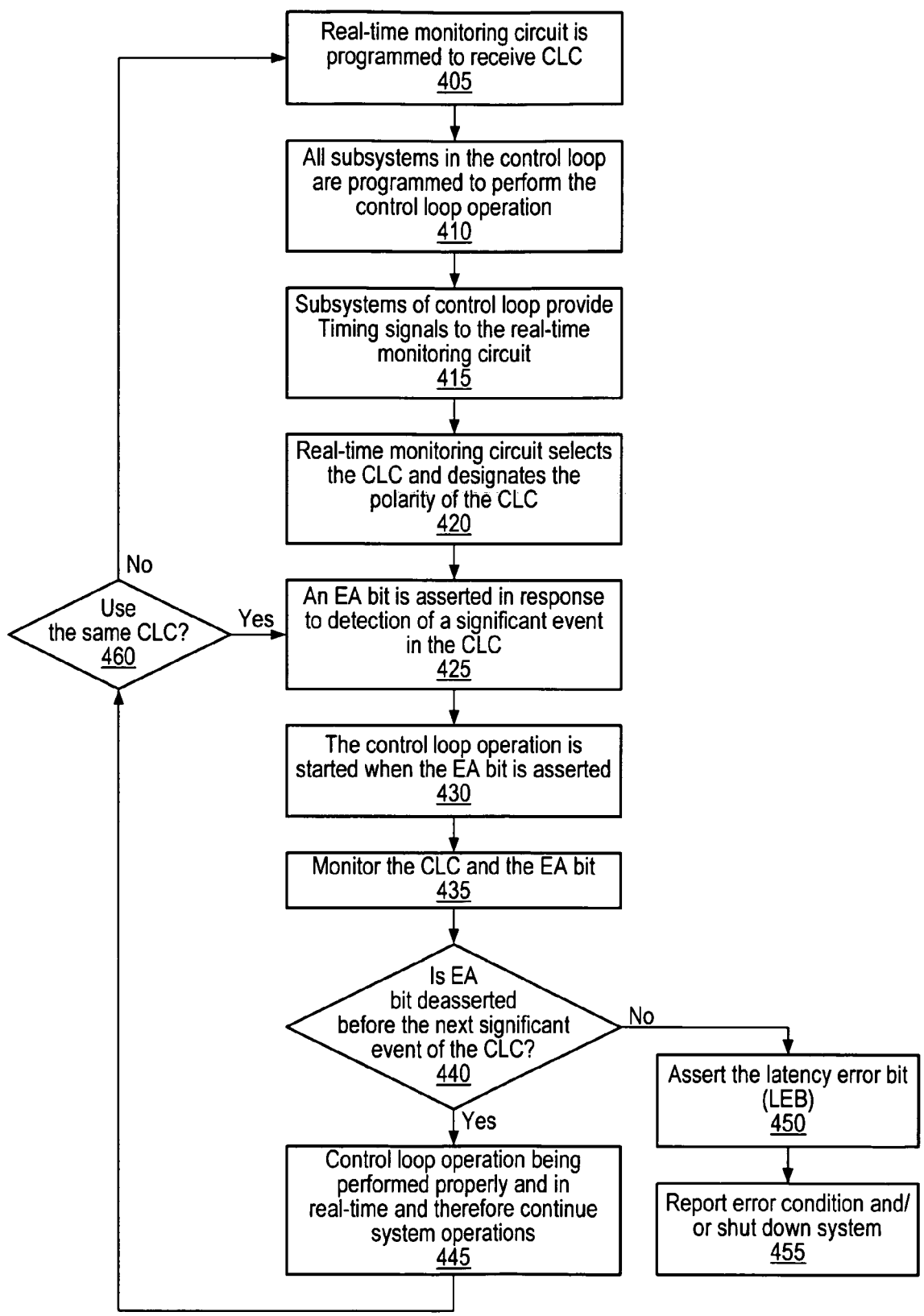
FIG. 4 is a flow diagram illustrating a method for implementing a control loop operation in a data acquisition system using a real-time monitoring circuit, according to one embodiment.

FIG. 4 is a flow diagram illustrating a method for implementing a control loop operation in a data acquisition system using a real-time monitoring circuit, according to one embodiment. It should be noted that in various embodiments, some of the steps shown may be performed concurrently, in a different order than shown, or omitted. Additional steps may also be performed as desired.

Referring collectively to FIG. 3 and FIG. 4, the real-time monitoring circuit 275 may be configured to monitor the CLC 325 and may determine whether the operations of the control loop are performed within the CLC period by communicating with the processing unit 320. In one embodiment, the processing unit 320 may first program the real-time monitoring circuit 275 to select a particular CLC signal (e.g., CLC 325) received from one of the subsystems (e.g., subsystem 310A) that will be involved in the control loop operation, as indicated in 405. For example, the processing unit 320 may program the register 330 of the real-time monitoring circuit 275 with RT monitor control bits 333, which may control the operation of the MUX 315, the polarity selection unit 327, the edge detector 350, and the edge detector 360. In one embodiment, the register 330 may be a configuration register. It is noted however that in other embodiments the register 330 may be replaced by other programmable mechanisms with similar functionality.

In addition, the processing unit 320 may program all the subsystems 310 in the control loop 300 to perform the specific control loop operation, as indicated in 410. In one embodiment, at least a portion of the subsystems 310 may send timing signals 313 to the real-time monitoring circuit 275, as indicated in 415. In another embodiment, all the subsystems 310 in the control loop may send the timing signals 313 to the circuit 275. The timing signals 313 may be received at a selectable input (e.g., the MUX 315), which may select the CLC 325 based on a portion of the programmed RT monitor control bits 333, as indicated in 420. The CLC 325 is typically provided from a resource that is part of one of the subsystems 310 of the control loop, for example, in an analog input operation, the CLC 325 may be a convert signal for an ADC generated by the data acquisition device. In this example, when a convert signal (e.g., the CLC 325) is generated, the analog input operation needs to take place before the next convert signal. Then, the polarity selection unit 327 may designate a particular polarity of the CLC 325 as the start of significant events, as indicated in 420. For example, the polarity selection unit 327 may designate the rising edge or the falling edge of the CLC 325 as the start of the significant events, which will trigger the timing of the control loop operation. It is noted however, that in other embodiments the CLC 325 may be provided from other sources, e.g., from the processing unit 320.

After the polarity is designated, the CLC 325 may then be received at the edge detector 350 and at the edge detector 360. In 425, an event active (EA) bit 355 may be asserted in response to the edge detector 350 detecting a significant event in the CLC 325. The EA bit 355 may then be stored in register 340, which in one embodiment may be a status register. It is noted however that in other embodiments the register 340 may be replaced by other memory mechanisms.

In one embodiment, when the EA bit 355 is enabled, the real-time monitoring circuit 275 may generate an interrupt to the processing unit 320 to notify that a significant event occurred. In response to the notification, the processing unit 320 may communicate with all the subsystems 310 in the control loop 300 to initiate the control loop application, as indicated in 430. In one example, the processing unit 320 may wait for the subsystems 310 to perform their tasks, wait for the inputs associated with the operation to be ready, read the inputs, execute control algorithms, generate outputs, and program the output resources. It is noted that the tasks described above are meant to be exemplary only, and are not intended to limit the invention to any specific control loop operation. For example, in various embodiments, one or more of the tasks described may be omitted, modified, or additional tasks included, as desired. It is also noted that in other embodiments the processing unit 320 may be notified of the detection of the significant event by other means, for example, the subsystem (e.g., subsystem 310A) that is providing the CLC 325 may send a signal directly to the processing unit 320 which may indicate the beginning of a significant event. In one embodiment, the subsystem 310A may be an analog input module which may provide a convert signal (e.g., the CLC 325) to the processing unit 320 to indicate the start of a significant event.

During the control loop operation, the edge detector 360 monitors the CLC 325 and the EA bit 355 to detect any state changes, as indicated by 435. After the control loop operation has been completed, the processing unit 320 may acknowledge the significant event to indicate the completion of the operation. In one embodiment, the acknowledge signal provided by the processing unit 320 may change the state of one or more of the RT monitor control bits 333 stored in register 330. The edge detector 350 may deassert the EA bit 355 in response to the acknowledge signal changing the state of the RT monitor control bits 333. It is noted however that the acknowledgement from the processing unit 320 may clear the EA bit by other methods. It is also noted that in some embodiments the EA bit may be deasserted by other means, for example, by a signal sent from one of the subsystems 310.

The edge detector 360 is configured to determine whether the EA bit was deasserted before or after the next significant event of the CLC 325 is detected, as indicated in 440. If the acknowledge signal is received before the next CLC significant event, then the control loop operation is being performed properly and in real-time, as indicated by 445, and the system continues implementing control loop applications. However, as indicated in 450, if the acknowledge signal is received after the next CLC significant event, then the edge detector 360 may assert a latency error bit (LEB) 365 to indicate an error, i.e., that the CLC period is faster than the time it took to perform the control loop operation.

The LEB 365 may be one or more of the RT monitor status bits 343, which are stored in the register 340. In response to the error, an interrupt may be generated to notify the processing unit 320 of the error condition. It is noted however that in other embodiments the processing unit 320 may be notified of the error condition by other means, for example, the processing unit 320 may continuously check the state of the RT monitor status bits 343, including the LEB 365. The processing unit 320 may take appropriate action, such as shutting down the system, reporting an error or warning, in response to receiving the notification, as indicated in 455. In some instances, the processing unit 320 may ignore the error, reset the LEB 365, and try again. For example, in some processor designs having long pipelines of instructions, some initial errors may be expected as a startup condition due to the architecture of the processors.

In one embodiment, after the LEB 365 is asserted and the appropriate action is performed to resolve the error condition, the processing unit 320 may reset the edge detector 360 to deassert the LEB 365. The processing unit 320 may reset the edge detector 360 via the RT reset signal 357. Also, the processing unit 320 may enable the real-time monitoring circuit 275 via the RT monitor enable signal 347. Both the RT reset signal 357 and the RT monitor enable signal 347 may be generated by changing the state of one or more of the RT monitor control bits 333 of the register 330.

In 460, when the same CLC 325 is used to perform the next control loop operation, the EA bit 355 is asserted in response to detecting the next significant event associated with the CLC 325. Otherwise, the method is repeated and the processing unit 320 may program the real-time monitoring circuit 275 to select one of the received timing signals 315 as the CLC 325, as indicated by 405. It should be noted that in various embodiments, some of the steps shown may be performed concurrently, in a different order than shown, or omitted. Additional steps may also be performed as desired.

In one embodiment the edge detector 350 and/or edge detector 360 may be implemented in software. In another embodiment the edge detector 350 and/or edge detector 360 may be may be implemented in hardware. In yet another embodiment, the edge detector 350 and/or edge detector 360 may be implemented in both hardware and software. In one embodiment, the functionality described above with respect to the edge detector 350 and/or edge detector 360 may be distributed across multiple components. In various embodiments, this type of functional distribution may also apply to other components described herein.

It is noted that the real-time monitoring circuit 275 is configured to provide feedback to a control loop operation trying to keep real-time operation. The circuit 275 monitors the timing of the complete control loop (e.g., control loop 300) regardless of how many subsystems are involved in the loop. As described above, the system may comprise several subsystems of the data acquisition device or may include other devices and networks outside the data acquisition device. For example, one of the subsystems (e.g., subsystem 310a) of the control loop 300 may be a controller area network (CAN), which may be used to communicate with different devices in an automobile. In this example, the control loop may include a data acquisition board (e.g., DAQ device 102) acquiring data from some sensors, a processing unit (e.g., processing unit 320), and a CAN. The data acquisition board and the CAN may be asynchronous and unrelated; however, the real-time monitoring circuit 275 may still monitor the overall timing of the control loop, including the execution of instructions associated with the CAN. In one embodiment, the CAN (i.e., an external device or network) may be providing the CLC 325 in addition to instructions for the loop.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for implementing control loop operations, the system comprising:
   a plurality of subsystems, wherein at least a portion of the plurality of subsystems are operable to provide a plurality of timing signals for the system; and
   a real-time monitoring unit coupled to the portion of the plurality of subsystems, wherein the real-time monitoring unit is operable to receive the plurality of timing signals and to select a control loop timing signal out of the plurality of timing signals, wherein the real-time monitoring unit comprises:
   a first edge detector unit operable to receive the control loop timing signal and detect a significant event in the control loop timing signal indicating a start of a time period allotted for completion of the control loop operation, wherein the real-time monitoring unit is operable to determine whether the control loop operation is performed within the time period.

2. The system of claim 1, further comprising a processing unit coupled to the plurality of subsystems and to the real-time monitoring unit, wherein the processing unit is operable to program the real-time monitoring unit to select the control loop timing signal received from the one of the plurality of subsystems.

3. The system of claim 2, wherein the processing unit is operable to program the plurality of subsystems to perform the control loop operation.

4. The system of claim 2, wherein the first edge detector unit is operable to assert an event active (EA) bit in response to detection of the significant event in the control loop timing signal.

5. The system of claim 4, wherein the processing unit is operable to start the control loop operation when the EA bit is asserted.

6. The system of claim 5, wherein the real-time monitoring unit is operable to notify to the processing unit when the EA bit is asserted, wherein the processing unit is operable to start the control loop operation in response to receiving the notification.

7. The system of claim 4, wherein, after the EA bit is asserted, one of the plurality of subsystems is operable to provide an interrupt to the processing unit, wherein the processing unit is operable to start the control loop operation in response to receiving the interrupt.

8. The system of claim 5, wherein the processing unit is operable to provide an acknowledge signal to the real-time monitoring unit when the control loop operation has been completed.

9. The system of claim 8, wherein the real-time monitoring unit is operable to deassert the EA bit in response to receiving the acknowledge signal from the processing unit.

10. The system of claim 8, wherein the acknowledge signal is received by the real-time monitoring unit before a subsequent significant event is detected if the control loop operation was performed within the allotted time period.

11. The system of claim 8, further comprising a second edge detector unit operable to detect an error in the implementation of the control loop operation.

12. The system of claim 11, wherein if the acknowledge signal is received by the real-time monitoring unit after a subsequent significant event is detected, the second edge detector unit is operable to assert a latency error bit to indicate the control loop operation was not completed within the allotted time period.

13. The system of claim 12, wherein the real-time monitoring unit is operable to notify the processing unit when the latency error bit is asserted to indicate that the control loop operation was not performed within the allotted time period.

14. The system of claim 13, wherein the processing unit is operable to shut down the system in response to receiving the notification that the latency error bit is asserted.

15. A data acquisition system for implementing control loop operations, the data acquisition system comprising:
- a plurality of subsystems, wherein at least a portion of the plurality of subsystems are operable to provide a plurality of timing signals for the data acquisition system; and
- a data acquisition device coupled to the plurality of subsystems, the data acquisition device comprising:
  - a real-time monitoring unit operable to receive the plurality of timing signals and to select a control loop timing signal out of the plurality of timing signals, wherein the real-time monitoring unit comprises:
    - a first edge detector unit operable to receive the control loop timing signal and detect a significant event in the control loop timing signal indicating a start of a time period allotted for completion of the control loop operation, wherein the real-time monitoring unit is operable to determine whether the control loop operation is performed within the time period.

16. The data acquisition system of claim 15, further comprising a processing unit coupled to the plurality of subsystems and to the real-time monitoring circuit, wherein the processing unit is operable to program the real-time monitoring unit to select the control loop timing signal received from the one of the plurality of subsystems.

17. The data acquisition system of claim 16, wherein the first edge detector unit is operable to assert an event active (EA) bit in response to detection of the significant event in the control loop timing signal, wherein the real-time monitoring unit is operable to notify to the processing unit when the EA bit is asserted, wherein the processing unit is operable to start the control loop operation in response to receiving the notification.

18. The data acquisition system of claim 17, wherein the processing unit is operable to provide an acknowledge signal to the real-time monitoring unit when the control loop operation has been completed, wherein the real-time monitoring unit is operable to deassert the EA bit in response to receiving the acknowledge signal from the processing unit.

19. The data acquisition system of claim 18, further comprising a second edge detector unit operable to detect an error in the implementation of the control loop operation.

20. The data acquisition system of claim 19, wherein if the acknowledge signal is received by the real-time monitoring unit after a subsequent significant event is detected, the second edge detector unit is operable to assert a latency error bit to indicate the control loop operation was not completed within the allotted time period, wherein the real-time monitoring unit is operable to notify the processing unit when the latency error bit is asserted.

21. The data acquisition system of claim 15, further comprising a unit under test (UUT), wherein the UUT comprises a sensor operable to provide the data acquisition device with sensor data, wherein the data acquisition device is operable to provide the sensor data to the processing unit for analysis during the control loop operation.

22. A method for implementing control loop operations in a system, wherein the system comprises a plurality of subsystems and a real-time monitoring unit, the method comprising:
- the plurality of subsystems providing a plurality of timing signals to the system;
- a real-time monitoring unit receiving the plurality of timing signals from the plurality of subsystems and selecting a control loop timing signal out of the plurality of timing signals;
- detecting a significant event in the control loop timing signal indicating a start of a time period allotted for completion of the control loop operation; and
- the real-time monitoring unit determining whether the control loop operation is performed within the time period.

23. The method of claim 22, wherein the system further comprises a processing unit, wherein said selecting the control loop timing signal out of the plurality of timing signals comprises the processing unit programming the real-time monitoring unit to select the control loop timing signal received from the one of the plurality of subsystems.

24. The method of claim 23, further comprising the processing unit programming the plurality of subsystems to perform the control loop operation.

25. The method of claim 23, wherein the real-time processing unit comprises a first edge detector unit for detecting the significant event in the control loop timing signal indicating the start of the time period allotted for the completion of the control loop operation, further comprising the first edge detector unit asserting an event active (EA) bit in response to detection of the significant event in the control loop timing signal.

26. The method of claim 25, further comprising the processing unit starting the control loop operation when the EA bit is asserted.

27. The method of claim 25, further comprising the real-time monitoring unit notifying the processing unit when the EA bit is asserted and the processing unit starting the control loop operation in response to receiving the notification.

28. The method of claim 27, further comprising the processing unit providing an acknowledge signal to the real-time monitoring unit when the control loop operation has been completed.

29. The method of claim 28, further comprising the real-time monitoring unit deasserting the EA bit in response to receiving the acknowledge signal from the processing unit.

30. The method of claim 28, wherein the real-time monitoring unit comprises a second edge detector unit for detecting an error in the implementation of the control loop operation.

31. The method of claim 30, wherein said determining whether the control loop operation is performed within the time period comprises asserting a latency error bit to indicate the control loop operation was not completed within the allotted time period if the acknowledge signal is received by the real-time monitoring unit after a subsequent significant event is detected.

32. The method of claim 31, further comprising the real-time monitoring unit notifying the processing unit when the latency error bit is asserted to indicate that the control loop operation was not performed within the allotted time period.

33. The method of claim 32, further comprising the processing unit shutting down the system in response to receiving the notification that the latency error bit is asserted.

* * * * *